United States Patent
Cowan

(10) Patent No.: US 12,100,119 B2
(45) Date of Patent: *Sep. 24, 2024

(54) ENHANCING GENERATIVE ADVERSARIAL NETWORKS USING COMBINED INPUTS

(71) Applicant: X Development LLC, Mountain View, CA (US)

(72) Inventor: Eliot Julien Cowan, Atherton, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,272

(22) Filed: Feb. 15, 2023

(65) Prior Publication Data

US 2023/0196509 A1  Jun. 22, 2023

Related U.S. Application Data

(63) Continuation of application No. 17/371,319, filed on Jul. 9, 2021, now Pat. No. 11,610,284.

(51) Int. Cl.
*G06T 3/4046* (2024.01)
*G06F 18/21* (2023.01)
(Continued)

(52) U.S. Cl.
CPC .......... *G06T 3/4046* (2013.01); *G06F 18/214* (2023.01); *G06F 18/217* (2023.01);
(Continued)

(58) Field of Classification Search
CPC ... G06T 3/4046; G06T 3/4053; G06F 18/214; G06F 18/217; G06F 18/251; G06N 3/045; G06N 3/08; G06V 20/13
(Continued)

(56) References Cited

U.S. PATENT DOCUMENTS 5,052,043 A * 9/1991 Gaborski ............... G06N 3/084
706/20
2018/0075581 A1  3/2018 Shi et al.
(Continued)

OTHER PUBLICATIONS

Ballard et al., "FireSRnet: Geoscience-Driven Super-Resolution of Future Fire Risk from Climate Change," CoRR, Nov. 2020, arxiv.org/abs/2011.12353, 9 pages.
(Continued)

*Primary Examiner* — Juan A Torres

(74) *Attorney, Agent, or Firm* — Fish & Richardson P.C.

(57) ABSTRACT

Methods, systems, and apparatus, including computer programs encoded on computer storage media, for generating a synthesized signal. A computer-implemented system obtains generator input data including an input signal having one or more first characteristics, processes the generator input data to generate output data including a synthesized signal having one or more second characteristics using a generator neural network, and outputs the synthesized signal to a device. The generator neural network is trained, based on a plurality of training examples, with a discriminator neural network. The discriminator neural network is configured to process discriminator input data that combines a discriminator input signal having the one or more second characteristics with at least a portion of generator input data to generate a prediction of whether the discriminator input signal is a real signal or a synthesized signal.

20 Claims, 5 Drawing Sheets

(51) Int. Cl.
  *G06F 18/214* (2023.01)
  *G06F 18/25* (2023.01)
  *G06N 3/045* (2023.01)
  *G06N 3/08* (2023.01)
  *G06T 3/4053* (2024.01)
  *G06V 20/13* (2022.01)

(52) U.S. Cl.
  CPC ........... *G06F 18/251* (2023.01); *G06N 3/045* (2023.01); *G06N 3/08* (2013.01); *G06T 3/4053* (2013.01); *G06V 20/13* (2022.01)

(58) Field of Classification Search
  USPC .......................................................... 382/157
  See application file for complete search history.

(56) References Cited

U.S. PATENT DOCUMENTS

| | | | |
|---|---|---|---|
| 2020/0155881 A1* | 5/2020 | Tohidi | G06F 16/9038 |
| 2020/0356810 A1 | 11/2020 | Zhong et al. | |
| 2022/0122222 A1* | 4/2022 | Smith | G06T 11/001 |
| 2022/0269906 A1 | 8/2022 | Takeda et al. | |
| 2022/0327657 A1 | 10/2022 | Zheng et al. | |
| 2022/0366533 A1 | 11/2022 | Cowan et al. | |

OTHER PUBLICATIONS

Dong et al., "RRSGAN: Reference-Based Super-Resolution for Remote Sensing Image," IEEE Transactions on Geoscience and Remote Sensing, Jan. 2021, 60:1-17.
Gao et al., "Image super-resolution based on conditional generative adversarial network," IET Image Processing, Nov. 2020, 14(13):3006-3013.
International Search Report and Written Opinion in International Appln. No. PCT/US2022/073452, dated Oct. 17, 2022, 15 pages.
Ledig et al., "Photo-Realistic Single Image Super-Resolution Using a Generative Adversarial Network," CoRR, Sep. 2016, https://arxiv.org/abs/1609.04802, 19 pages.
Liu et al., "PSGAN: A Generative Adversarial Network for Remote Sensing Image Pan-Sharpening," IEEE Transactions on Geoscience and Remote Sensing, Mar. 2020, 14(8):15 pages.
Niu et al., "Image Translation Between High-Resolution Remote Sensing Optical and SAR Data Using Conditional GAN," LNCS, Sep. 2018, 11166:245-255.
Rakotonirina et al., "ESRGAN+ : Further Improving Enhanced Super-Resolution Generative Adversarial Network," CoRR, Jan. 2020, https://arxiv.org/abs/2001.08073, 5 pages.
Wang et al., "ESRGAN: Enhanced Super-Resolution Generative Adversarial Networks," CoRR, Sep. 2018, https://arxiv.org/abs/1809.00219, 23 pages.
International Preliminary Report on Patentability in International Appln. No. PCT/US2022/073453, dated Jan. 18, 2024, 9 pages.

* cited by examiner

ENHANCING GENERATIVE ADVERSARIAL NETWORKS USING COMBINED INPUTS

CROSS REFERENCE TO RELATED APPLICATION

This patent application is a continuation (and claims the benefit of priority under 35 USC 120) of U.S. patent application Ser. No. 17/371,319, filed Jul. 9, 2021. The disclosure of the prior application is considered part of (and is incorporated by reference in) the disclosure of this application.

BACKGROUND

Generative adversarial networks (GANs) are machine-learning neural networks for learning features in training data to generate new data having the same characteristics as the training data. The GAN includes a generator neural network that generates the new data and a discriminator neural network that provides feedback to the generator neural network on how to improve the generated data.

SUMMARY

In a generative adversarial network (GAN) model, the generator neural network generally aims to generate an output signal that plausibly could have been drawn from the input data, and the discriminator neural network aims to classify a signal as either "real" (from a training dataset) or fake (generated by the generator neural network). In one example, a computer implemented system can use the generator neural network to process a low-resolution input image to generate a high-resolution synthesized image, and use the discriminator neural network to predict whether a high-resolution image inputted to the discriminator neural network is a real high-resolution image (e.g., provided in one of the training examples) or a high-resolution image synthesized by the generator neural network. The system can use the prediction generated by the discriminator neural network to update the network parameters of the generator neural network to cause the generator neural network to generate high-resolution synthesized images that are more realistic.

For training a discriminator neural network of a GAN model to make the predictions, the system uses a plurality of training examples. Each training example includes at least a training signal in the same domain as the signal generated by the generator neural network. Typically, the system uses either the output of the generator neural network or the training signal in the training example as the input data to the discriminator neural network. The discriminator neural network processes the input to predict whether the input is a generated signal outputted by the generator neural network or a "real" (training) signal. The system updates the network parameters of the discriminator neural network based on a loss function that measures a comparison of the prediction outputted by the discriminator neural network and whether the input is the generated signal outputted by the generator neural network or the training signal. That is, the discriminator neural network is trained to differentiate a signal generated by the generator neural network and a real signal.

This specification describes systems, methods, devices, and other techniques related to improving the performance and/or training efficacy of a GAN model.

In one aspect of the specification, a method is provided for generating a synthesized signal using a GAN model. The GAN model includes a generator neural network and a discriminator neural network. The system obtains input data for the generator neural network (termed as the generator input data for convenience). The generator input data includes at least an input signal having one or more first characteristics. The system processes the generator input data to generate output data including a synthesized signal having one or more second characteristics using the generator neural network. The generator neural network is trained, based on a plurality of training examples, with the discriminator neural network. The input data to the discriminator neural network (termed as the discriminator input data for convenience) combines a discriminator input signal having the one or more second characteristics and at least a portion of the generator input data. The discriminator neural network is configured to process the discriminator input data to generate a prediction of whether the discriminator input signal is a label signal provided in one of the plurality of training examples (considered as a "real" signal) or a synthesized signal outputted by the generator neural network. The system further outputs the synthesized signal to a device.

In another aspect of the specification, a method is provided for training a GAN model. The GAN model includes a generator neural network and a discriminator neural network. The generator neural network is configured to process generator input data including at least an input signal having one or more first characteristics to generate output data including a synthesized signal having one or more second characteristics. The discriminator neural network is configured to process discriminator input data that combines a discriminator input signal having the one or more second characteristics and at least a portion of the generator input data, and generate a prediction of whether the discriminator input signal is a signal provided in one of the plurality of training examples (considered as a "real" signal) or a synthesized signal outputted by the generator neural network.

To train the generator neural network and the discriminator neural network, the system obtains a plurality of training examples. Each training example includes at least a first training signal having the one or more first characteristics and a second training signal having the one or more second characteristics. Based on each training example, the system generates training input data for the generator neural network by including at least the first training signal in the training example, and processes the training input data using the generator neural network to generate the synthesized signal. The system generates a first instance of the discriminator input data by combining the synthesized signal and at least a portion of the training input data for the generator neural network, and processes the first instance of the discriminator input data using the discriminator neural network to generate a first prediction. The system also generates a second instance of the discriminator input data by combining the second training signal and the portion of the training input data for the generator neural network, and processes the second instance of the discriminator input data using the discriminator neural network to generate a second prediction. The system updates a first set of network parameters of the discriminator neural network based on a first loss function measuring a comparison of the prediction outputted by the discriminator neural network and whether the discriminator input signal in the discriminator input data is the second training signal or the synthesized signal, and updates a second set of network parameters of the generator neural network based on a second loss function including at least an adversarial loss that measures a decreasing function of the prediction outputted by the discriminator neural network while the discriminator input signal included in the discriminator input data is the synthesized image outputted by the generator neural network. A greater value of the adversarial loss indicates that the discriminator neural network predicts a decreased probability of the input high-resolution image in the discriminator input data being a "real" image.

In an example implementation, the GAN model is used for generating a high-resolution synthesized image from a low-resolution input image. The input signal and synthesized signals are both images. The first characteristic can be a first spatial resolution for an image. And the second characteristic can be a second spatial resolution for an image that is different from the first spatial resolution. Concretely, in this example, the input signal is a low-resolution input image having a first spatial resolution. The synthesized signal is a high-resolution synthesized image having a second spatial resolution higher than the first spatial resolution. The discriminator input signal a high-resolution image having the second spatial resolution, and can be either a high-resolution "real" image provided in one of the plurality of training examples, or a high-resolution synthesized signal outputted by the generator neural network.

Further, the GAN model can be used for generating high-resolution synthesized distribution maps indicating fire distribution of an area with fire burning. The generator input data includes a low-resolution input image (the input signal) indicating fire distribution of the area with fire burning and a reference input image that indicates features of the area. The low-resolution input image has a first spatial resolution. The reference input image has a third spatial resolution that is higher than the first spatial resolution. The computer system then uses the generator neural network to process the low-resolution input image and the reference input image to generate a high-resolution synthesized image indicating the fire distribution of the area in a second spatial resolution that is higher than the first spatial resolution, and thus providing high-resolution fire distribution features needed for understanding the spreading behavior of wildfires.

For training the generator neural network and the discriminator neural network, each of the training examples further includes a low-resolution training image (the first training signal) having the first SR, a high-resolution training image (the second training signal) having the second SR, and a reference training image having the third spatial resolution. The discriminator input data includes the discriminator input signal (the high-resolution synthesized image or the high-resolution training image in this case) combined with at least a portion of the training input data for the generator neural network, including, e.g., the low-resolution training image and/or the reference training image.

In some other examples of implementations, the GAN model can be used for generating hi-fi audios, high-resolution videos, or other types of signals.

In general, the described system and associated methods improve the performance and/or training efficacy of a GAN model. The GAN model can be used for generating a signal, such as a high-resolution synthesized image, based on at least an input signal, such as a low-resolution input image.

Typically, the discriminator neural network of a GAN model aims to differentiate a signal generated by the generator neural network and a real signal provided in a training example, and thus the input to the discriminator neural network usually only includes the signal outputted by the discriminator neural network or the real signal in the training example. The system and methods described in this specification improve the performance and/or training efficacy of the GAN model by incorporating at least a portion of the input data to the generator neural network (the generator input data) in the input data to the discriminator neural network (the discriminator input data) during the training of the discriminator neural network. This way, instead of aiming to differentiate a signal generated by the generator neural network and a real signal without any reference, the trained discriminator neural network resulted by the process provided in this specification can determine whether an input signal to the discriminator neural network (e.g., a high-resolution image) is a reasonable processed version (e.g., with resolution upscaling) of another input signal (e.g., a low-resolution input image).

In the implementation example of generating high-resolution synthesized distribution maps indicating fire distribution of an area with fire burning, by incorporating the low-resolution training image and the reference training image into the discriminator input data, the discriminator neural network is more effectively trained to determine whether a high-resolution image is a reasonable upscaling of the low-resolution input image according to the reference input image. The resulted improvement include better prediction accuracy of the discriminator neural network, better quality in the high-resolution synthesized images generated by the generator neural network, and/or improved training efficiency, such as requiring fewer training examples to achieve a specific performance metric of the GAN model and thus reducing computing power required to perform the training.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A generative adversarial network (GAN) model has been employed in many applications for generating a signal, such as for image resolution-upscaling tasks. This specification describes systems, methods, devices, and other techniques that use a GAN model to generate a synthesized signal, such as a high-resolution fire distribution map, with improved performance and/or training efficacy for the GAN model. The GAN model includes a generator neural network and a discriminator neural network.

A feature of the described system and methods is that, during training of the GAN model, the system incorporates, in the input data to the discriminator neural network, at least a portion of the input data to the generator neural. This way, instead of aiming to differentiate a signal generated by the generator neural network and a real signal without reference, the trained discriminator neural network can be more effective in determining whether an input signal to the discriminator neural network (e.g., a high-resolution image) is a reasonable processed version (e.g., with resolution upscaling) of another input signal (e.g., a low-resolution input image).

Figure 1:
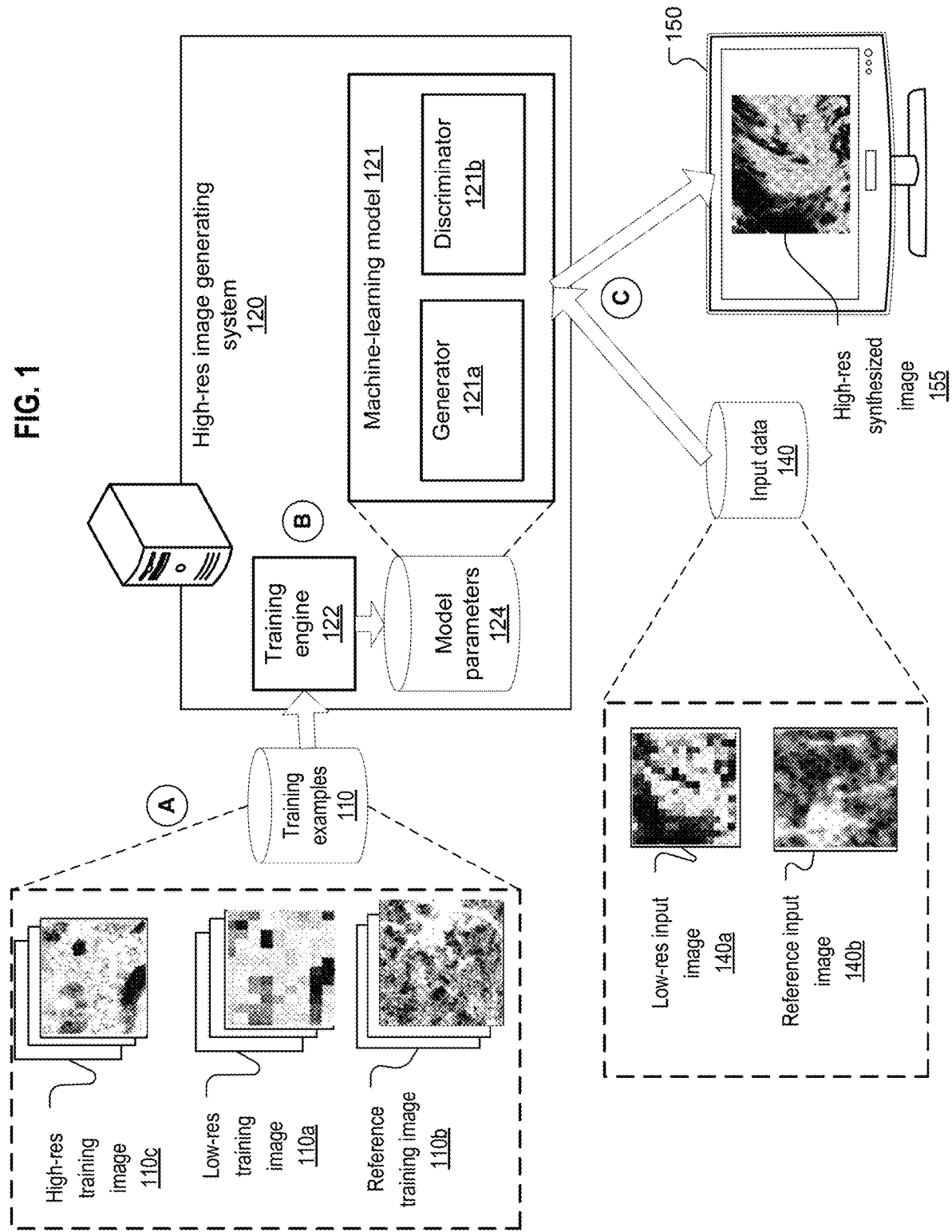
FIG. 1 shows an example high-resolution image generating system.

FIG. 1 shows an example high-resolution image generating system 120. System 120 is an example of a system implemented as computer programs on one or more computers in one or more locations, in which the systems, components, and techniques described below can be implemented.

While system 120 is focused on generating a high-resolution synthesized image indicating fire distribution features, other types of synthesized signals can be generated using similar systems, including, for example, hi-fi audios and videos with high spatial and/or temporal resolutions. System 120 is an example of systems for generating a variety types of synthesized signals.

In order to build useful models of wildfire spread and wildfire behaviors, accurate, high-resolution training data of actual real-world fires is required. Unfortunately, the vast majority of observational datasets of wildfires available today have low resolution and/or are collected infrequently. For example, many satellite-based remote-sensing infrared (IR) imaging systems typically take survey infrared images with low resolutions, for example, with spatial resolution of around or lower than 400 m/pixel. The systems that provide higher-resolution survey images may only acquire the higher-resolution infrared images in every 12 hours, and sometimes in every two weeks. The low spatial and/or temporal resolutions in available datasets make it challenging to use them to understand and predict wild fire spread using data driven model-based prediction.

The system 120 can be used to automatically generate high-resolution fire distribution maps based on available fire-related data with low spatial resolutions and pre-fire/post-fire geophysical maps of the corresponding area. The system 120 can receive an input of a low-resolution distribution map indicating fire distribution of an area and a high-resolution reference input image of the same area, and outputs a high-resolution synthesized image indicating fire distribution of the area.

As shown in stage (A) and stage (B) in FIG. 1, the system 120 can obtain a plurality of training examples 110, and processes the training examples 110 using a training engine 122 of the system to update network parameters 124 of a machine-learning model 121. Each training example can include a low-resolution training image 110a of an area, a reference training image 110b of the same area, and a high-resolution training image 110c of the same area.

As shown in stage (C) in FIG. 1, the system 120 can obtain input data 140, process the input data 140 using the machine-learning model 121 with the learned network parameters 124 and outputs a high-resolution synthesized image 155 based on the processing results to an output device 150. The input data can include a low-resolution input image 140a of an area with fire burning and a reference input image 140b of the same area.

In this specification, "low-resolution" and "high-resolution" describe spatial resolutions in a relative sense. For example, when the input image 140a has a first spatial resolution $R_1$ (e. g., 400 m/pixel), and the high-resolution synthesized image 155 has a second spatial resolution $R_2$ (e. g., 20 m/pixel), since the second spatial resolution $R_2$ is higher resolution than the first resolution $R_1$, the high-resolution synthesized image 155 is deemed as a high-resolution map while the input image 140a is deemed a low-resolution map.

In the example shown in FIG. 1, the low-resolution input image 140a can be a low-resolution infrared image. In general, the low-resolution input image 140a can include a distribution map or dataset that indicates fire distribution of an area with fire burning. The low-resolution infrared image is an example of the distribution map.

Since active fire burning on the ground emits spectral signals that are characterized by increased emissions of mid-infrared radiation, which can be captured by satellite infrared sensors, a satellite infrared image can indicate a spatial distribution of active fire. The low-resolution infrared image 140a can be an infrared image in a single infrared band that corresponds to heat distribution, such as in a mid-IR band with central wavelengths of 2.1 µm, 4.0 µm, or 11.0 µm. The low-resolution infrared image 140a can also include additional infrared data in other infrared bands, such as in one or more near-IR bands with central wavelengths of 0.65 µm and/or 0.86 µm. These near-IR data can be used to calibrate artifacts such sun glint and cloud reflections. The low-resolution infrared image 140a can include multiple-channel infrared images taken at a plurality of infrared bands, or a composite infrared image that combines multiple-channel infrared images. In addition to the infrared images, the low-resolution input image 140a can further include calibration and geolocation information, which can be used to pre-process the infrared images to ensure consistency between data sources and across different time points.

In certain implementations, instead of receiving infrared images directly from instrument measurements or simply combining multi-channel infrared images, the low-resolution input image 140a of the input data can include derived products, such as a fire distribution map generated by processing multiple remote sensing images using fire-detection algorithms. A variety of fire products that map fire hotspots based on satellite remote-sensing images have been developed and are available from several organizations, and can be used as the input low-resolution input image 140a.

Whether being directly received remote-sensing measurements, or derived fire maps using fire-detection algorithms, a large quantity of maps indicating fire distribution can be retrieved from satellite remote-sensing image archives, or from satellite remote sensing image providers in near real-time. These maps can include a sequence of images taken at multiple time points for a same area, and thus can include information of the temporal features of fire spreading behavior. However, these maps often have poor spatial resolution, that is, each pixel in the map corresponds to a large area, and cannot provide spatially finer details of fire distribution.

The reference input image 140b, on the other hand, can provide higher-resolution features of the same area. In the example shown in FIG. 1, the reference input image 140b is a high-resolution aerial landscape image of the same area. In general, the reference input image 140b can include a reference input image indicating certain features of the area. The reference input image 140b has a spatial resolution higher than the spatial resolution of the low-resolution input image 140a. For example, the low-resolution input image 140a can have a spatial resolution around or below 400 m/pixel, while the reference input image 140b can have a spatial resolution around or higher than 20 m/pixel.

In addition to having a different spatial resolution, the reference input image 140b can be collected by sensors or imaging devices at a time point different from when the low-resolution input image 140a is collected. For example, the low-resolution input image 140a can be collected during an active fire, while the reference input image 140b can be collected at a pre-fire time point or a post-fire time point, such as days, weeks, or months before or after the low-resolution input image 140a is collected. During active fire burning, a sequence of images 140a can be collected at multiple time points for the same area, thus providing information on the temporal spreading behavior of the fire. A reference input image 140b can be used in conjunction with each of the sequence of images 140a to form the input data 140.

Further, the features indicated in the reference input image 140b can be features other than fire or temperature-related distributions. That is, the reference input image 140b can have a modality that is different from the modality of the low-resolution input image 140a. For example, the low-resolution input image 140a can be an infrared image or a fire distribution map derived from remote-sensing infrared data, while the reference input image 140b can be an image in the visible wavelength range or a non-optical image. Examples of the reference input image 140b include satellite images in the visible band (e. g., with central wavelength of 0.65 μm), aerial photos (e. g., collected by drones), labeled survey maps, and vegetation index maps calculated from visible and near-IR images. The reference input images 140b can provide information related to fire susceptibility, in higher resolutions compared to the input images 140a, on features such as topographical features (e.g., altitudes, slopes, rivers, coastlines, etc.), man-made structures (roads, buildings, lots, etc.), vegetation indexes, and/or soil moistures of the same area. The reference input image can also be a post-fire map that shows the burn scars of the area, which also provides information that indicates fire susceptibility.

In certain implementations, the system 120 can further perform pre-processing of the input data. For example, the system 120 can use calibration data to calibrate the satellite infrared images and use the geolocation data to align and register the satellite infrared images with the reference input image. The system can further convert a satellite infrared image set in the input data to a fire-distribution map based on a fire-detection algorithm. The fire-detection algorithm can include processes such as cloud masking, background characterization and removal, sun-glint rejection, and applying thresholds. The system 120 can then process the pre-processed input data, using a machine-learning model 121, to generate output data that includes a high-resolution synthesized image 155.

In the example shown in FIG. 1, the high-resolution synthesized image 155 is a fire-distribution map that shows, in higher spatial resolution, distribution of locations of fire burning. The fire-distribution map can be a binary map that has pixels with a high intensity value or a low intensity value. Pixels with the high intensity value in the map indicate active fire burning at the corresponding locations, while pixels with the low intensity value in the map indicate no active fire burning at the corresponding locations. Alternatively, the synthesized image 155 can have multiple or a continuous distribution of pixel intensity values. Pixels with higher intensity values can indicate locations with increased probability of active fire burning. Alternatively, pixels with higher intensity values can indicate locations with higher intensities of fire burning, for example, different pixel intensity values can be mapped to different levels of fire radiative power (FRP).

In some implementations, the high-resolution synthesized image 155 can include a fire distribution map derived from a probabilistic posterior distribution of possible fire distribution maps. The output of the machine learning model may also include a quantification of the model's uncertainty at each output pixel.

The machine-learning model 121 is based on a generative adversarial neural network (GAN), which includes a generator neural network 121a to generate synthesized data and a discriminator neural network 121b to differentiate synthesized data from "real" data.

Although GANs have been employed for resolution-upscaling tasks in the past, those efforts were usually focused on designing a proper perceptual loss function in order to create a visually realistic image with increased resolution. By contrast, the GAN model 121 provided in this specification aims to leverage the additional information provided in the reference input image 140b in generating high-resolution fire distribution maps. Unlike past super-resolution GAN models, the system 120 does not aim to provide images that are visually pleasing. This allows for a training process that is focused on learning the dynamics of fires.

Specifically, as shown in stage (C) in FIG. 1, the machine-learning model 121 of the system 120 takes both the low-resolution input image 140a and the reference input image 140b as input, and generates the output data including the high-resolution synthesized image 155.

The GAN model 121 includes both the generator neural network 121a and the discriminator neural network 121b. The generator neural network 121a is used to process a neural-network input to generate the output data. The neural-network input to the generator neural network 121a can be a combination of the low-resolution input image 140a and the reference input image 140b. For example, the input can be formed by stacking the low-resolution distribution map and the reference input image.

The generator neural network 121a can include a plurality of network layers, including, for example, one or more fully connected layers, convolution layers, parametric rectified linear unit (PReLU) layers, and/or batch normalization layers. In certain implementations, the generator neural network 121a can include one or more residual blocks that include skip connection layers.

The generator neural network 121a includes a set of network parameters, including, e.g., weight and bias parameters of the network layers. These parameters are updated in a training process to minimize a loss characterizing difference between the output of the model and a desired output. The set of network parameters of the generator neural network 121a are part of the network parameters 124 of the machine learning model 121. The system 120 further includes a training engine 122 to update these network parameters 124.

In the GAN configuration, the generator neural network 121a is trained together with the discriminator neural network 121b based on a plurality of training examples, as shown in stage (B) of FIG. 1. The discriminator neural network 121b can include a plurality of network layers, including, for example, one or more convolution layers, leaky rectified linear unit (ReLU) layers, dense layers, and/or batch normalization layers. The network parameters of the discriminator neural network 121b are also included in the network parameters 124, and are updated together with the network parameters of the generator neural network 121a in a repeated and alternating fashion during the train process. The discriminator neural network 121b outputs a prediction of whether an input to the discriminator neural network 121b is a real distribution map or a synthesized distribution map.

The training data used for updating the network parameters 122 includes a plurality of training examples 110. Each training example includes a set of three distribution maps, including a low-resolution training image 110a indicating fire distribution of an area, a reference training image 110b indicating features of the same area, and a high-resolution training image 110c as "real" label data. In the example shown in FIG. 1, the low-resolution training image 110a is an infrared image, the reference training image 110b is an aerial landscape image, and the high-resolution training image 110c is a fire distribution map. In general, similar to the discussion on the data types in the input data 140 and output map 155, the low-resolution training image 110a, the reference training image 110b, and the high-resolution training image 110c can be other types of images indicating fire distribution or land features. For example, the low-resolution training image 110a can be a derived fire-distribution map, the high-resolution training image 110c can be a high-resolution infrared map, and the reference training image 110b can be a vegetation index map.

As shown in stage (A) of FIG. 1, the plurality of training examples are collected and used by the training engine 122 for updating the network parameters 124. In each training example, the low-resolution training image 110a, the reference training image 110b, and the high-resolution training image 110c correspond to the same geographical area. Further, in each training example, the low-resolution training image 110a and the high-resolution training image 110c correspond to the same time point.

In some instances, both high-resolution and low-resolution satellite measurements are available for the same area at the same time point during an active fire. These measurements can be collected as the high-resolution training image 110c and the low-resolution training image 110a, respectively. In some other instances, when only the high-resolution satellite measurements are available for an area under active fire burning, the low-resolution training image 110a can be generated by down-sampling the corresponding high-resolution training image 110c in order to create additional training examples.

In some implementations, further re-sampling can be performed to ensure that the low-resolution training images 110a in the training examples have a same spatial resolution as the low-resolution input image 140a in the input data, the reference training images 110b in the training examples have a same spatial resolution with the reference input image 140b in the input data, and the high-resolution distribution maps 110c in the training examples have a same spatial resolution as the high-resolution synthesized image 155 in the output data.

During training, the training engine 122 updates the network parameters 124 of the generator neural network 121a and the discriminator neural network 121b based on the plurality of training samples 110. In some implementations, the training engine 122 can update the network parameters 124 by repeatedly performing two alternating operations.

In the first step, the training engine 122 updates a first set of network parameters (e.g., weighting and bias parameters) of the discriminator neural network 121b based on a loss function that measures a difference between the prediction outputted by the discriminator and whether the input to the discriminator neural network includes the high-resolution training image 110c in one of the training examples 110, or a high-resolution synthesized image 155 outputted by the generator neural network.

In the second step, the training engine 122 updates a second set of network parameters (e.g., weighting and bias parameters) of the generator neural network 121a based a second loss function. The second loss function includes an adversarial loss that measures a decreasing function of the prediction outputted by the discriminator neural network while the input to the discriminator neural network includes the synthesized image outputted by the generator neural network. A greater value of the adversarial loss indicates that the discriminator neural network predicts a decreased probability of the input high-resolution image in the discriminator input data being a "real" image.

Further details of the training process performed by the training engine 122 will be described with references to FIG. 2 and FIG. 4. Briefly, an important feature of the training process is that during training, the input data to the discriminator neural network includes at least a portion of the training input data to the generator neural network. That is, in addition to the high-resolution synthesized image outputted by the generator neural network or the high-resolution training image 110c in one of the training examples, the input data to the discriminator neural network further includes the low-resolution training image 110a and/or the reference training image 110b.

Typically, the discriminator neural network of a GAN model aims to differentiate a signal generated by the generator neural network and a real signal provided in a training example, and thus the input to the discriminator neural network usually only includes the signal outputted by the discriminator neural network or the real signal in the training example. By incorporating a portion of the input signal to the generator neural network into the input signal to the discriminator neural network during training, the training engine 122 improves the performance and/or training efficacy of the GAN model, since discriminator neural network is more effectively trained to determine whether a high-resolution image is a reasonable upscaling of the low-resolution input image according to the reference input image. The resulted improvement include better prediction accuracy of the discriminator neural network, better quality in the high-resolution synthesized images generated by the generator neural network, and/or improved training efficiency, such as requiring fewer training examples to achieve a specific performance metric of the GAN model and thus reducing computing power required to perform the training.

Further, in many conventional GAN models for generating high-resolution images, an image of noise is passed into the generator neural network. By contrast, in the GAN model provided by this specification, the noise image cannot be considered as one of the generator input reference images because the noise image does not have a static value epochs.

In some implementations, the noise image is neither passed through the generator nor through the discriminator neural networks. In some other implementations, a noise image can be included in the input to the discriminator neural network. When training the discriminator neural network on "real" examples, the training engine can create a fake noise image to be paired with the real example. In yet some other implementations, for a "real" example, the training engine can use the same noise image that was most recently included in that example's counterpart input to generator.

Figure 2:
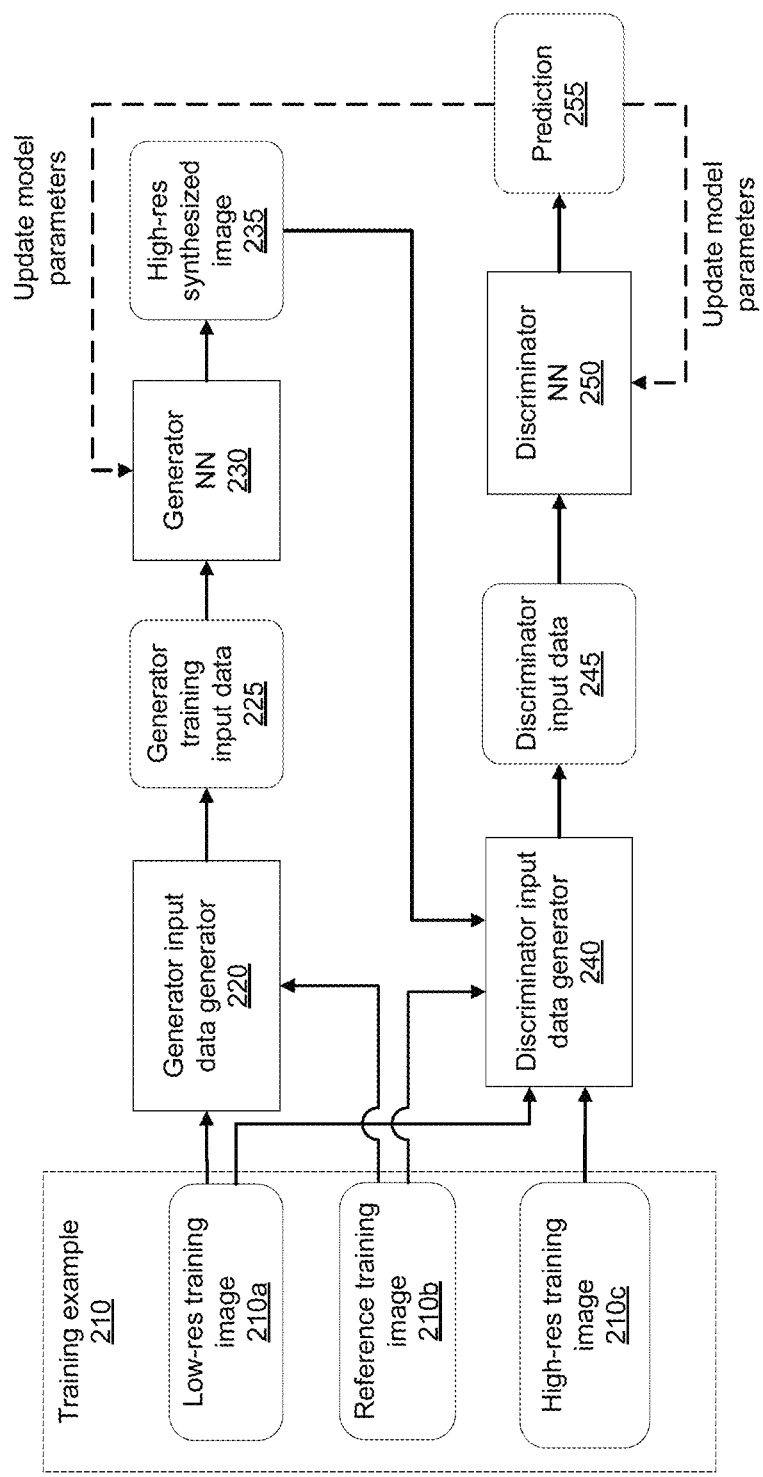
FIG. 2 shows an example process to train a GAN model used in the high-resolution image generating system.

FIG. 2 shows a training process to learn network parameters of the GAN model. For convenience, the process illustrated in FIG. 2 will be described as being performed by a system of one or more computers located in one or more locations. For example, the high-resolution image generating system 120 of FIG. 1, appropriately programmed in accordance with this specification, can include a training engine 122 to perform the process. The training engine can learn the network parameters of the generator neural network 230 and the discriminator neural network 250 based on a plurality of training examples 210.

In the specific example shown in FIG. 2, each training example includes a low-resolution training image 210a (e.g., that indicates fire distribution of an area with active fire burning) with a first spatial resolution, a high-resolution training image 210c (e.g., that indicates the fire distribution of the area with higher spatial resolution), and a reference training image 210b (e.g. that indicates features related to fire-susceptibility of the area). The training engine uses the high-resolution input training image 210c as "real" data labels.

The training engine includes a generator input data generator 220 that generates training input data 225 for the generator neural network. For each training example, the training input data 225 for the generator neural network includes the low-resolution training image 210a and the reference training image 210b. The generator input data generator 220 can generate the training input 225 by combining, e.g., by stacking, the low-resolution training image 210a with the reference training image 210b.

The training engine also includes a discriminator input data generator 240 that generates the discriminator input data 245. The discriminator input data 245 is the input data to the discriminator neural network. An important feature of the training process is that the discriminator input data 245 includes at least a portion of the generator training input data 225, e.g., the low-resolution training image 210a and/or the reference training image 210b.

In some implementations, the discriminator input data 245 can include all of the generator training input data 225, i.e., both the low-resolution training image 210a and the reference training image 210b. The training engine can combine the generator training input data 225 with a high-resolution discriminator input image to form the discriminator input data 245. The high-resolution discriminator input image can be the high-resolution synthesized image 235 outputted by the generator neural network or the high-resolution training image 210c (the "real" image).

Concretely, the discriminator input data generator 240 can generate a first instance of the discriminator input data 245 by combining (e.g., by stacking) the high-resolution synthesized image 235 outputted by the generator neural network with the generator training input data (i.e., the low-resolution training image 210a and/or the reference training image 210b). The discriminator input data generator 240 can also generate a second instance of the discriminator input data 245 by combining (e.g., by stacking) the high-resolution training image 210c with the generator training input data (i.e., the low-resolution training image 210a and the reference training image 210b).

The training engine uses the discriminator neural network 250 to process the first and the second instances of the discriminator input data 245, respectively, and generates a prediction 255 to distinguish between the high-resolution synthesized image 235 and the high-resolution training image 210 (the "real" image) included in the discriminator input data 245. In an example, the prediction 255 can be a score measuring the probability of the discriminator input data 245 including the "real" image. For example, an outputted score of "1" indicates that the discriminator neural network predicts the discriminator input data 245 including the high-resolution training image 210c, while an outputted score of "0" indicates that the discriminator neural network predicts the discriminator input data 245 including the high-resolution synthesized image 235.

The training engine can update the network parameters of the discriminator neural network 250 based on a first loss function that measures a prediction error of the discriminator neural network, i.e., a comparison difference between the outputted prediction 255 and whether the discriminator input data 245 includes the high-resolution synthesized image 235 (i.e., the input data of the discriminator neural network being the first instance of the discriminator input data) or the discriminator input data 245 includes the high-resolution training image 210c (i.e., the input data of the discriminator neural network being the second instance of the discriminator input data). The training engine can update the network parameters of the discriminator neural network 250 to minimize the first loss function using any appropriate backpropagation-based machine learning technique, e.g., by using the Adam or AdaGrad optimizers.

The training engine can update the network parameters of the generator neural network 230 based on a second loss function. The second loss function can include an adversarial loss that measures a decreasing function of the prediction 255 outputted by the discriminator neural network while the discriminator input data includes the high-resolution synthesized image 235 outputted by the generator neural network. A greater value of the adversarial loss indicates that the discriminator neural network predicts a decreased probability of the input high-resolution image in the discriminator input data 235 being a "real" image. The training engine can update the network parameters of the generator neural network 230 to minimize the second loss function using any appropriate backpropagation-based machine learning technique, e.g., by using the Adam or AdaGrad optimizers.

The training engine can repeat the updating operations in an alternating manner, until a stop criterion is reached, e. g., when a difference between the high-resolution synthesized images and the high-resolution training images is below a threshold. The network parameters of the generator neural network 230 and the network parameters of the discriminator neural network 250 both improve over time during the repeated alternating training process.

Figure 3:
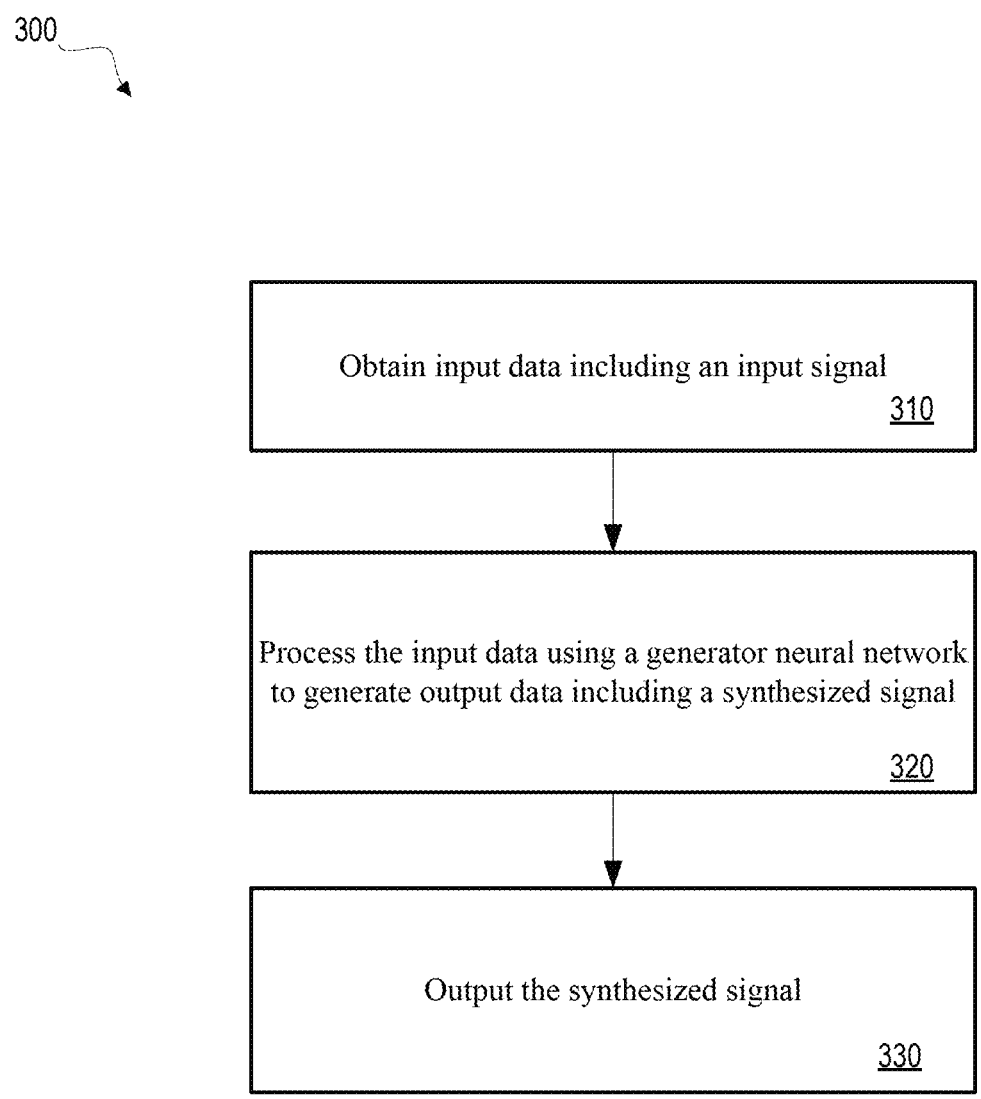
FIG. 3 is a flow diagram of an example process of generating a synthesized signal using a GAN model.

FIG. 3 is a flow chart illustrating an example process 300 for generating synthesized signals using a GAN model. For convenience, the process 300 will be described as being performed by a system of one or more computers located in one or more locations. For example, a signal generating system, e.g., the high-resolution image generating system 120 of FIG. 1, appropriately programmed in accordance with this specification, can perform the process 300.

In general, in performing process 300, the system uses a GAN model to generate a synthesized signal based on an input signal. The input signal has one or more first characteristics. The synthesized signal has one or more second characteristics that are different from the one or more first characteristics. For example, the input signal can be a low-resolution input image having a first spatial resolution. The synthesized signal can be a high-resolution synthesized image having a second spatial resolution higher than the first spatial resolution.

The GAN model includes a generator neural network and a discriminator neural network. The system processes at least the input signal to generate output data including the synthesized signal. The generator neural network is trained, based on a plurality of training examples, with the discriminator neural network.

As shown in FIG. 3, the process 300 includes the following operations.

In operation 310, the system obtains generator input data including at least an input signal. The generator input data is the input data to the generator neural network. The system can obtain the generator input data from various sources, such as from a computing device, a data acquisition device, or a storage device, via a data transmission interface or a network. The input signal has one or more first characteristics. The input signal can be an audio signal, an image, a video, or another type of signal.

In one example implementation, the input signal is a low-resolution input image having a first spatial resolution that maps spatial distribution of a fire of an area with fire burning. An example of the data type of the low-resolution input image includes low-resolution satellite infrared images in one or more bands. Another example of the low-resolution input image includes a fire distribution map derived from satellite infrared measurements. In an illustrative example, the first spatial resolution can be a resolution around or no higher than 400 m/pixel.

The generator input data can include other data, such as a reference signal, in addition to the input signal. The system can generate the generator input data by combining, e.g., by concatenating or stacking the input signal with the reference signal. For example, in the example implementation described above, the generator input data can further include a reference input image of the same area. The reference input image can have a spatial resolution higher than the first spatial information, and contain information indicating features of the area. For example, the reference input image can be a satellite image in the visible band, aerial photos (e. g., collected by drones), labeled survey maps, and vegetation index maps calculated from visible and near-IR images. The reference input image can be collected before the fire, and provide information related to fire susceptibility, in higher resolutions compared to the low-resolution input image, on features such as topographical features (e.g., altitudes, slopes, rivers, coastlines, etc.), man-made structures (roads, buildings, lots, etc.), vegetation indexes, and/or soil moistures of the same area. The reference input image can also be a post-fire image that shows the burn scars of the area, which also provides information that indicates fire susceptibility. The system can generate the generator input data by combining, e.g., by stacking the low-resolution input image with the reference input image.

In operation 320, the system processes the generator input data using the generator neural network of the GAN model to generate output data including a synthesized signal. The synthesized signal can be an audio signal, an image, a video, or another type of signal. The synthesized signal has one or more second characteristics that are different from the one or more first characteristics of the input signal.

In an example implementation, while the input signal is a low-resolution input image having a first spatial resolution, and the synthesized signal is the high-resolution synthesized image having a second spatial resolution higher than the first spatial resolution. That is, the generator neural network generates a synthesized image that has an up-scaled resolution and provides finer spatial details compared to the input image. For example, the first spatial resolution of the low-resolution input image can be a resolution around or no higher than 400 m/pixel, and the second resolution of the high-resolution synthesized image can be a resolution higher than 20 m/pixel.

When the generator input data includes additional data, the system can combine the input signal with the additional data (e.g., a reference signal) to form the input to the generator neural network, and uses the generator neural network to process the combined input to generate the synthesized signal. For example, the generator input data can include the low-resolution input image with the first spatial resolution (the input signal having the first characteristics) and a reference input image having a spatial resolution higher than the first spatial information (the reference signal). The system can use the generator neural network to process an input combining the low-resolution input image and the reference input image to generate the output data including a high-resolution synthesized image (the synthesized signal having the second characteristics).

The generator neural network used to process the generator input data can include a plurality of network layers, including, for example, one or more fully connected layers, convolution layers, parametric rectified linear unit (PReLU) layers, and/or batch normalization layers. In certain implementations, the generator neural network can include one or more residual blocks that include skip connection layers.

The generator neural network includes a set of network parameters, including weight and bias parameters of the network layers. The set of network parameters of the generator neural network are termed as the first set of network parameters for convenience. The first set of network parameters are updated in a training process to minimize a loss characterizing difference between the output of the model and a desired output.

The training process for obtaining the network parameters will be described with reference to FIG. 4. Briefly, the generator neural network is trained, based on a plurality of training examples, with a discriminator neural network of the GAN model. The discriminator neural network is configured to process discriminator input data including a discriminator input signal. The discriminator input signal has the one or more second characteristics as the synthesized signal outputted by the generator neural network. For example, when the synthesized signal is the high-resolution synthesized image having the second spatial resolution, the discriminator input signal for the discriminator neural network is also a high-resolution image having the second spatial resolution. The discriminator neural network processes the second input to generate a prediction of whether the discriminator input signal in the discriminator input data is a real signal provided in one of the plurality of training examples or a synthesized signal outputted by the generator neural network An important feature of the training process is that, the discriminator input data (input for the discriminator neural network) includes at least a portion of the data that has been used as an input to the generator neural network during the training process. For example, a training example can include a low-resolution training image having a first spatial resolution, a high-resolution training image having a second spatial resolution higher than the first spatial resolution, and a reference training image having a third spatial resolution higher than the first spatial resolution. The training input data for the generator neural network can include the low-resolution training image and the reference training image. By processing the training input data for the generator neural network that combines the low-resolution training image and the reference training image using the generator neural network, the system can generate a high-resolution synthesized image (the synthesized signal) having the second spatial resolution. The system then generates the discriminator input data by combining a high-resolution discriminator input image with at least a portion of the training input data for the generator neural network including, e.g., the low-resolution training image and/or the reference training image. The high-resolution discriminator input image can be the high-resolution synthesized image outputted by the generator neural network or the high-resolution training image. In this case, the portion of the training input data for the generator neural network that is also included in the discriminator input data include the low-resolution training image and/or the reference training image.

In operation 330, the system outputs the synthesized signal to a device. In an example implementation, the synthesized signal is a high-resolution synthesized image, and the system can output the high-resolution synthesized image to a display device for displaying the image, to a storage device to store the image data, or to a network device to transmit the image data to a user device.

Figure 4:
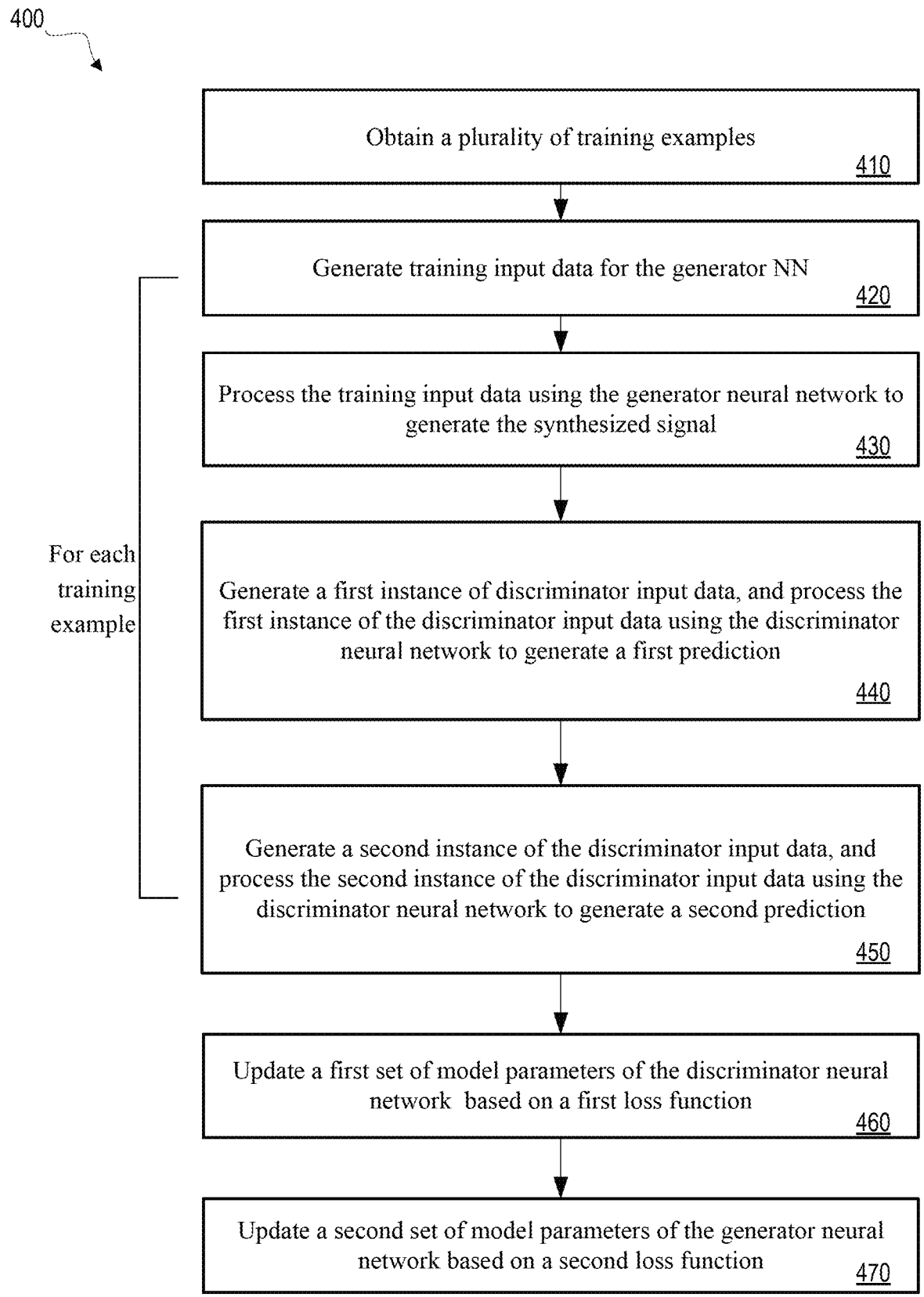
FIG. 4 is a flow diagram of an example process of training a GAN model.

FIG. 4 is a flow chart illustrating a method 400 for training a GAN model. For convenience, the process 400 will be described as being performed by a system of one or more computers located in one or more locations. For example, a signal generating system, e.g., the high-resolution image generating system 120 of FIG. 1, appropriately programmed in accordance with this specification, can include a training engine 122 to perform the process 400.

In general, in performing process 400, the system trains, based on a plurality of training examples, the GAN model including a generator neural network and a discriminator neural network. The generator neural network is configured to process generator input data that includes an input signal to generate output data including a synthesized signal. The input signal has one or more first characteristics, and the synthesized signal has one or more second characteristics that a different from the first characteristics. The generator neural network can include a plurality of network layers, including, for example, one or more fully connected layers, convolution layers, parametric rectified linear unit (PReLU) layers, and/or batch normalization layers. In certain implementations, the generator neural network can include one or more residual blocks that include skip connection layers.

The generator neural network includes a set of network parameters, including weight and bias parameters of the network layers. The set of network parameters of the generator neural network are termed as the first set of network parameters for convenience.

The discriminator neural network is configured to process discriminator input data that combines a discriminator input signal and at least a portion of the generator input data to generate a prediction of whether the discriminator input signal is a real signal provided in one of the plurality of training examples or a synthesized signal outputted by the generator neural network.

The discriminator neural network can include a plurality of network layers, including, for example, one or more convolution layers, leaky rectified linear unit (ReLU) layers, dense layers, and/or batch normalization layers. The discriminator neural network also includes a set of network parameters, including weight and bias parameters of the network layers. The set of network parameters of the discriminator neural network are termed as the second set of network parameters for convenience.

Similar to the GAN model described in reference to FIG. 3, the input signal for the generator neural network model has one or more first characteristics. For example, the input signal can be a low-resolution input image having a first spatial resolution. The synthesized signal outputted by the generator neural network has one or more second characteristics different from the one or more first characteristics. For example, the synthesized signal can be a high-resolution synthesized image having a second spatial resolution higher than the first spatial resolution. Like the synthesized signal, the discriminator input signal for the discriminator neural network also has the one or more second characteristics. For example, the discriminator input signal can be a high-resolution image having the second spatial resolution.

During the training process, the first set of network parameters for the generator neural network can be updated with the second set of network parameters for the discriminator neural network in a repeated and alternating fashion as detailed in the following operations.

In operation 410, the system obtains the plurality of training examples. In some implementations, the system can obtain data containing the plurality of training examples from various sources, such as from a computing device, a data acquisition device, or a storage device, via a data transmission interface or a network. Each training example includes at least a first training signal having the one or more first characteristics and a second training signal having the one or more second characteristics. In some other implementations, the system can at least partially generate the training examples based on computations, for example, by performing data synthesis and/or processing.

The first and the second training signals can be audios, videos, images, or other type of signals. For example, the first training signal is a low-resolution training image having a first spatial resolution. The second training signal is a high-resolution image having a second spatial resolution higher than the first spatial resolution.

In one example implementation, the first training signal is a low-resolution training image that maps spatial distribution of a fire of an area with fire burning with a first spatial resolution (e.g., a resolution around or no higher than 400 m/pixel). The second training signal is a high-resolution image that maps spatial distribution of the fire of the same area with increased spatial resolution (e.g., a resolution higher than 20 m/pixel).

An example of the low-resolution training image includes low-resolution satellite infrared images in one or more bands. Another example of the low-resolution training image includes a fire distribution map derived from satellite infrared measurements. In some instances, both high-resolution and low-resolution satellite measurements are available for the same area at the same time point during an active fire. These measurements can be collected as the high-resolution training image (the second training signal) and the low-resolution training image (the first training signal), respectively. In some other instances, when only the high-resolution satellite measurements are available for an area under active fire burning. In these cases, in order to create additional training examples, the system can generate the low-resolution training image by down-sampling the corresponding high-resolution training image.

In some implementations, the generator neural network is configured to process an input including the input signal and a reference signal to generate the synthesized signal. Thus, in addition to the first and the second training signals, each training example further includes a reference training signal having one or more third characteristics. In the example implementation described above, the reference training signal can be a reference training image having a third spatial resolution higher than the first spatial resolution. The reference training image can contain information indicating features of the area. For example, the reference input image can be a satellite image in the visible band, aerial photos (e.g., collected by drones), labeled survey maps, and vegetation index maps calculated from visible and near-IR images. The reference training image can be collected before the fire, and provide information related to fire susceptibility, in higher resolutions compared to the low-resolution input image, on features such as topographical features (e.g., altitudes, slopes, rivers, coastlines, etc.), man-made structures (roads, buildings, lots, etc.), vegetation indexes, and/or soil moistures of the same area. The reference input image can also be a post-fire image that shows the burn scars of the area, which also provides information that indicates fire susceptibility.

Based on each of the plurality of training examples, the system repeatedly performs operations 420-450.

In operation 420, the system generates training input data for the generator neural network. The training input data for the generator neural network is the input data to the generator neural network based on the training example, and includes at least the first training signal in the training example. In some implementations, when the training example also includes a reference training signal, the training input data for the generator neural network further includes the reference training signal. The system can generate the training input data for the generator neural network by combining, e.g., by concatenating, the first training input signal with the reference training signal.

In an example implementation, the training example includes a low-resolution training image (the first training signal) having a first spatial resolution, a high-resolution training image (the second training signal) having a second spatial resolution higher than the first spatial resolution, and a reference training image (the reference training signal) having a third spatial resolution higher than the first spatial resolution. The system can generate the training input data for the generator neural network by combining the low-resolution training image with the reference training image.

In operation 430, the system processes the training input data using the generator neural network to generate the synthesized signal. The synthesized signal has the one or more second characteristics. For example, the system can process the training input data for the generator neural network that combines the low-resolution training image and the reference training image to generate a high-resolution synthesized image having the second spatial resolution.

In operation 440, the system generates a first instance of the discriminator input data by combining a first instance of a discriminator input signal with at least a portion of the training input data for the generator neural network, and processes the first instance of the discriminator input data using the discriminator neural network to generate a first prediction. The first instance of the discriminator input signal is the synthesized signal outputted by the generator neural network.

In an example implementation, the training example includes a low-resolution training image (the first training signal) having a first spatial resolution, a high-resolution training image (the second training signal) having a second spatial resolution higher than the first spatial resolution, and a reference training image (the reference training signal) having a third spatial resolution higher than the first spatial resolution. By processing the training input data for the generator neural network that combines the low-resolution training image and the reference training image using the generator neural network, the system can generate a high-resolution synthesized image (the synthesized signal) having the second spatial resolution. The system then generates the first instance of the discriminator input data by combining the high-resolution synthesized image outputted by the generator neural network with at least a portion of the training input data for the generator neural network including, e.g., the low-resolution training image and/or the reference training image. For example, in some instances, the portion of the training input data for the generator neural network can include only the low-resolution training image. In some other instances, the portion of the training input data for the generator neural network can include both the low-resolution training image and the reference training image.

In operation 450, the system generates a second instance of the discriminator input data by combining a second instance of the discriminator input signal with the portion of the training input data for the generator neural network, and processes the second instance of the discriminator input data using the discriminator neural network to generate a second prediction. The second instance of the discriminator input signal is the second training signal in the training example.

In the same example implementation as described in operation 440, the first instance of the discriminator input data includes the high-resolution synthesized outputted by the generator neural network with the portion of the training input data for the generator neural network including, e.g., the low-resolution training image and/or the reference training image. The system can generate the second instance of the discriminator input data by combining the high-resolution training image in the training example with the same portion of the training input data for the generator neural network as being included in the first instance of the discriminator input data. That is, the second instance of the discriminator input data includes the high-resolution training image combined with the portion of the training input data for the generator neural network that includes, e.g., the low-resolution training image and/or the reference training image.

In operation 460, the system updates a first set of network parameters of the discriminator neural network based on a first loss function. The first loss function can measure a comparison difference between the prediction outputted by the discriminator neural network and whether the discriminator input signal in the discriminator input data is the second training signal or the synthesized signal.

The discriminator neural network is configured to generate a prediction whether the discriminator input signal in the discriminator input data is a "real" signal provided in the training example (i.e., the second training signal) or the synthesized signal outputted by the generator neural network. For example, the discriminator neural network can output a prediction score ranging from 0-1 that predicts the probability of the discriminator input signal being a "real" signal (e.g., a prediction score of "1" for predicting that the discriminator input signal is the real signal and a prediction score of "0" for predicting that the discriminator input signal is the synthesized signal). For updating the network parameters (e.g., weight and bias parameters) of the discriminator neural network, the system can compute a prediction error of the discriminator neural network as the first loss function, and update the network parameters of the discriminator neural network to minimize the first loss function. The system can update the network parameters of the discriminator neural network based on the first loss function using any appropriate backpropagation-based machine learning technique, e.g., using the Adam or AdaGrad optimizers.

In operation 470, the system updates a second set of network parameters of the generator neural network based on a second loss function. The second loss function can include an adversarial loss that measures a decreasing function of the prediction outputted by the discriminator neural network while the discriminator input signal included in the discriminator input data is the synthesized signal outputted by the generator neural network. A greater value of the adversarial loss indicates that the discriminator neural network predicts a decreased probability of the discriminator input signal in the discriminator input data being a "real" signal.

In some implementations, after the network parameters of the discriminator neural network have been updated (as in operation 460), the system can use the updated discriminator neural network to generate the prediction again based on the synthesized signal outputted by the generator neural network as the as discriminator input signal in the discriminator input data. Then the system can update the network parameters of the generator neural network to minimize the second loss function that includes a measurement of a decreasing function of the prediction outputted by the generator neural network. The system can update the network parameters of the generator neural network based on the second loss function using any appropriate backpropagation-based machine learning technique, e.g., using the Adam or AdaGrad optimizers.

Step 460 and operation 470 for updating the network parameters of the discriminator neural network and the generator neural network can be repeated in an alternating manner, until a stop criterion is reached, e. g., when a difference between the synthesized signal and the "real" signal is below a threshold. The network parameters of the generator neural network and the network parameters of the discriminator neural network both improve over time during the repeated alternating training process.

Figure 5:
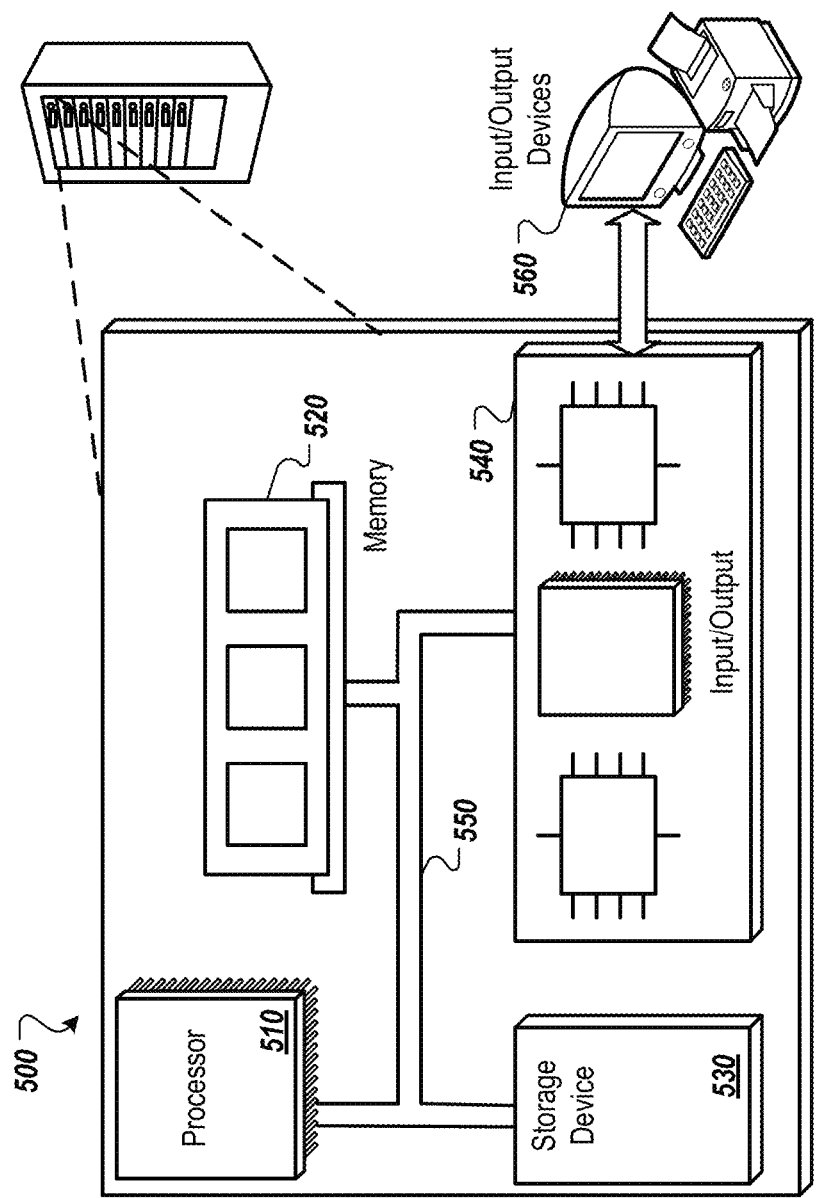
FIG. 5 shows an example computer system for performing operations described in the present specification.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (for example, a cloud storage device), or some other large capacity storage device.

The input/output device 540 provides input/output operations for the system 500. In one implementation, the input/output device 540 can include one or more network interface devices, for example, an Ethernet card, a serial communication device, for example, a RS-232 port, and/or a wireless interface device, for example, a 502.11 card. In another implementation, the input/output device can include driver devices configured to receive input data and send output data to other input/output devices, for example, keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, for example, a TensorFlow framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for training a generator neural network, comprising:
   obtaining a plurality of training examples, each of the training examples including a first training signal having one or more first characteristics, a second training signal having one or more second characteristics, and a reference training signal having one or more third characteristics;
   performing, based on each of the plurality of training examples:
      generating generator input data by including at least the first training signal in the training example, and processing the generator input data using the generator neural network to generate a synthesized signal,
      generating a first instance of discriminator input data by combining the first training signal in the training example, the synthesized signal, and the reference training signal in the training example, and processing the first instance of the discriminator input data using a discriminator neural network to generate a first prediction, and
      generating a second instance of the discriminator input data by combining the first training signal, the second training signal, and the reference training signal in the training example, and processing the second instance of the discriminator input data using the discriminator neural network to generate a second prediction;
   updating a first set of network parameters of the discriminator neural network based on a first loss function measuring a difference between the prediction outputted by the discriminator neural network and whether the discriminator input data includes the second training signal or the synthesized signal; and
   updating a second set of network parameters of the generator neural network based on a second loss function including at least the first prediction.

2. The computer-implemented method of claim 1, wherein:
   the first training signal is a low-resolution training image having a first spatial resolution;
   the synthesized signal is a high-resolution synthesized image having a second spatial resolution higher than the first spatial resolution; and
   the second training signal is a high-resolution training image having the second spatial resolution.

3. The computer-implemented method of claim 1, wherein obtaining the plurality of training examples comprises:
   for each of one or more of the plurality of training examples, generating a low-resolution training image from a high-resolution training image by down-sampling the high-resolution training image from a second spatial resolution to a first spatial resolution.

4. The computer-implemented method of claim 1, wherein the reference training signal is a reference image having a spatial resolution that is different from spatial resolutions of each of the first training signal and the second training signal.

5. The computer-implemented method of claim 1, wherein a spatial resolution of the reference training signal is higher than the spatial resolution of the second training signal.

6. The computer-implemented method of claim 1, wherein the reference training signal is associated with a different image modality from the first training signal.

7. The computer-implemented method of claim 1, wherein the reference training signal is associated with a different time point from the first training signal.

8. The computer-implemented method of claim 1, wherein:
   the first training signal is a low-resolution training image comprising a low-resolution distribution map characterizing fire distribution of an area with fire burning;
   the reference training signal is a reference image comprising a distribution map characterizing features of the area; and
   the first training signal is a high-resolution synthesized image comprising a high-resolution synthesized distribution map indicating the fire distribution of the area.

9. The method of claim 1, wherein the reference training signal characterizes a pre-fire fuel feature distribution of the area.

10. The method of claim 1, wherein the reference training signal characterizes one or more of: pre-fire topographical features, pre-fire man-made structures, pre-file vegetation indexes, and soil moistures of the area.

11. The method of claim 1, wherein the reference training signal characterizes post-fire burn scars of the area.

12. A system comprising:
   one or more computers; and
   one or more storage devices storing instructions that when executed by the one or more computers, cause the one or more computers to perform operations for training a generator neural network, the operations comprising:
      obtaining a plurality of training examples, each of the training examples including a first training signal having one or more first characteristics, a second training signal having one or more second characteristics, and a reference training signal having one or more third characteristics;
      performing, based on each of the plurality of training examples:
         generating generator input data by including at least the first training signal in the training example, and processing the generator input data using the generator neural network to generate a synthesized signal, generating a first instance of discriminator input data by combining the first training signal in the training example, the synthesized signal, and the reference training signal in the training example, and processing the first instance of the discriminator input data using a discriminator neural network to generate a first prediction, and generating a second instance of the discriminator input data by combining the first training signal, the second training signal, and the reference training signal in the training example, and processing the second instance of the discriminator input data using the discriminator neural network to generate a second prediction;

updating a first set of network parameters of the discriminator neural network based on a first loss function measuring a difference between the prediction outputted by the discriminator neural network and whether the discriminator input data includes the second training signal or the synthesized signal; and updating a second set of network parameters of the generator neural network based on a second loss function including at least the first prediction.

13. The system of claim 12, wherein:
the first training signal is a low-resolution training image having a first spatial resolution;
the synthesized signal is a high-resolution synthesized image having a second spatial resolution higher than the first spatial resolution; and
the second training signal is a high-resolution training image having the second spatial resolution.

14. The system of claim 12, wherein obtaining the plurality of training examples comprises:
for each of one or more of the plurality of training examples, generating a low-resolution training image from a high-resolution training image by down-sampling the high-resolution training image from a second spatial resolution to a first spatial resolution.

15. The system of claim 12, wherein the reference training signal is a reference image having a spatial resolution that is different from spatial resolutions of each of the first training signal and the second training signal.

16. The system of claim 12, wherein a spatial resolution of the reference training signal is higher than the spatial resolution of the second training signal.

17. The system of claim 12, wherein the reference training signal is associated with a different image modality from the first training signal.

18. One or more non-transitory computer-readable storage media storing instructions that, when executed by one or more computers, cause the one or more computers to perform operations for training a generator neural network, the operations comprising:

obtaining a plurality of training examples, each of the training examples including a first training signal having one or more first characteristics, a second training signal having one or more second characteristics, and a reference training signal having one or more third characteristics;

performing, based on each of the plurality of training examples:
generating generator input data by including at least the first training signal in the training example, and processing the generator input data using the generator neural network to generate a synthesized signal, generating a first instance of discriminator input data by combining the first training signal in the training example, the synthesized signal, and the reference training signal in the training example, and processing the first instance of the discriminator input data using a discriminator neural network to generate a first prediction, and generating a second instance of the discriminator input data by combining the first training signal, the second training signal, and the reference training signal in the training example, and processing the second instance of the discriminator input data using the discriminator neural network to generate a second prediction;

updating a first set of network parameters of the discriminator neural network based on a first loss function measuring a difference between the prediction outputted by the discriminator neural network and whether the discriminator input data includes the second training signal or the synthesized signal; and updating a second set of network parameters of the generator neural network based on a second loss function including at least the first prediction.

19. The one or more non-transitory computer-readable storage media of claim 18, wherein:
the first training signal is a low-resolution training image having a first spatial resolution;
the synthesized signal is a high-resolution synthesized image having a second spatial resolution higher than the first spatial resolution; and
the second training signal is a high-resolution training image having the second spatial resolution.

20. The one or more non-transitory computer-readable storage media of claim 18, wherein obtaining the plurality of training examples comprises:
for each of one or more of the plurality of training examples, generating a low-resolution training image from a high-resolution training image by down-sampling the high-resolution training image from a second spatial resolution to a first spatial resolution.

* * * * *